(12) United States Patent
Hipp-Kalthoff et al.

(10) Patent No.: US 9,956,844 B2
(45) Date of Patent: May 1, 2018

(54) CLIMATE CONTROL SYSTEM WITH BLOWERS, IN PARTICULAR IN AGRICULTURAL OR CONSTRUCTION MACHINERY

(75) Inventors: Christoph Hipp-Kalthoff, Simmozheim (DE); Klaus Voigt, Bietigheim-Bissingen (DE)

(73) Assignee: Behr Industry GmbH & Co. KG, Stuttgart (DE)

( * ) Notice: Subject to any disclaimer, the term of this patent is extended or adjusted under 35 U.S.C. 154(b) by 1136 days.

(21) Appl. No.: 12/511,611

(22) Filed: Jul. 29, 2009

(65) Prior Publication Data
US 2010/0029192 A1  Feb. 4, 2010

(30) Foreign Application Priority Data
Jul. 29, 2008  (DE) .................. 10 2008 035 403

(51) Int. Cl.
*B60H 1/22*  (2006.01)
*B60H 1/00*  (2006.01)

(52) U.S. Cl.
CPC ........... *B60H 1/00378* (2013.01); *B60H 2001/00085* (2013.01)

(58) Field of Classification Search
CPC ............ B60H 1/00678; B60H 1/00378; B60H 1/00085
USPC ....... 454/159, 158, 156, 136, 137, 141, 144, 454/151
See application file for complete search history.

(56) References Cited

U.S. PATENT DOCUMENTS

| | | | |
|---|---|---|---|
| 4,088,364 A * | 5/1978 | Termont .................. | 296/190.09 |
| 4,344,356 A | 8/1982 | Casterton et al. | |
| 4,467,706 A | 8/1984 | Batcheller et al. | |
| 4,531,453 A | 7/1985 | Warman et al. | |
| 4,612,975 A * | 9/1986 | Ikari ............................. | 165/43 |

(Continued)

FOREIGN PATENT DOCUMENTS

| | | |
|---|---|---|
| DE | 221 970 A5 | 5/1985 |
| DE | 696 13 734 T2 | 10/2001 |

(Continued)

OTHER PUBLICATIONS

JP63121518 Abstract.*

*Primary Examiner* — Gregory Huson
*Assistant Examiner* — Dana Tighe
(74) *Attorney, Agent, or Firm* — Muncy, Geissler, Olds & Lowe, P.C.

(57) ABSTRACT

A climate control system is provided that includes blowers, in particular in agricultural or construction machinery, having at least two blowers, at least one fresh air/circulating air conduit, at least one circulating air/intake air conduit, an evaporator and, if required, a heater, the evaporator and heater being situated on the air downstream side of the blowers, the blowers being situated at substantially the same height, viewed in a longitudinal direction of the vehicle. The first blower drawing in fresh air from at least one fresh air opening in the rear area of the vehicle, and the second blower drawing in at least circulating air from the vehicle interior from at least two circulating air openings situated on opposite sides of the vehicle, and at least one circulating air/intake air conduit running above and/or below the first blower and leading to the second blower from the circulating air opening on one side of the vehicle interior.

25 Claims, 5 Drawing Sheets

(56) References Cited

U.S. PATENT DOCUMENTS

| | | | |
|---|---|---|---|
| 5,119,718 A | 6/1992 | Wagner et al. | |
| 5,308,279 A * | 5/1994 | Grinberg | 454/139 |
| 5,690,549 A | 11/1997 | Webb et al. | |
| 6,003,593 A * | 12/1999 | Halligan | B60H 1/00378 |
| | | | 165/127 |
| 6,361,429 B1 * | 3/2002 | Pawlak, III | B60H 1/00207 |
| | | | 454/139 |
| 6,422,309 B2 * | 7/2002 | Vincent | 165/204 |
| 2005/0126774 A1 * | 6/2005 | Yamaguchi et al. | 165/204 |
| 2006/0186244 A1 | 8/2006 | Sachuk | |
| 2007/0298702 A1 * | 12/2007 | Boxum | 454/129 |

FOREIGN PATENT DOCUMENTS

| | | |
|---|---|---|
| EP | 0 042 597 A2 | 12/1981 |
| EP | 0 211 444 A2 | 2/1987 |
| EP | 0 438 076 A2 | 7/1991 |
| EP | 1 669 225 A1 | 6/2006 |
| FR | 2 400 161 | 3/1979 |
| JP | 63121518 A * | 5/1988 |

\* cited by examiner

CLIMATE CONTROL SYSTEM WITH BLOWERS, IN PARTICULAR IN AGRICULTURAL OR CONSTRUCTION MACHINERY

This nonprovisional application claims priority under 35 U.S.C. § 119(a) to German Patent Application No. DE 10 2008 035 403.1, which was filed in Germany on Jul. 29, 2008, and which is herein incorporated by reference.

BACKGROUND OF THE INVENTION

Field of the Invention

The invention relates to a climate control system with blowers, in particular in agricultural or construction machinery.

Description of the Background Art

To regulate a temperature of air in a vehicle, a climate control system is usually provided, which includes a blower for fresh and circulating air intake, an evaporator and a heater.

In many climate control systems, in particular in the cabs of agricultural or construction machinery, a main blower is provided along with an additional blower that delivers fresh air to the main blower for the purpose of equalizing the high drop in pressure that is frequently present in the intake tract of the cab. A climate control system of this type is described, for example, in U.S. Pat. No. 4,531,453. In this case, a fresh air blower draws in the fresh air from the upper rear area on one side of the vehicle via a fresh air opening. The blower is situated in the rear area of the vehicle, below the driver's seat, and delivers the fresh air to a precleaner and subsequently to a filter. In a mixing chamber, the fresh air is mixed with circulating air that is drawn in via a circulating air opening situated in the rear area of the cab and via a further filter. The mixed air is subsequently conducted through an evaporator and, if necessary, through a heater before the mixed air reaches the main blower and enters the cab through discharge openings situated on the side of the cab opposite the fresh air opening, i.e. the main blower delivers this mixed air to the cab through heat exchangers situated on the intake side. The rotary axes of the blowers are situated such that they are offset and parallel to each other, the main blower being situated slightly below and upstream from the fresh air blower on the side of the discharge openings. The evaporator is oriented in the direction of the vehicle's central longitudinal axis, and the heater is situated diagonally thereto.

U.S. Pat. No. 4,467,706 discloses a construction machine having an outside air blower that is used, in particular, to maintain the air pressure within the cab above atmospheric pressure. The outside air is drawn in via filters and passed downstream. A circulating air blower is also provided—independently of the outside air blower—which draws in circulating air from the cab via filters. Downstream from the blower, the circulating air is added to the outside air stream and, together with this outside air stream, directly reaches an evaporator and heater before the temperature-regulated mixed air is supplied to the cab. The two blowers are situated in a lower region of the construction machine, in front of the cab, the rotary axes of the blowers running parallel to each other and perpendicular to the central longitudinal plane of the vehicle. The circulating air blower is a blower that has two impellers, and the intake conduit is supplied to the blower from below. The fresh air blower is situated slightly higher and upstream from the circulating blower, so that the fresh air conduit is situated such that it runs above the circulating blower, starting from the fresh air blower.

However, this known climate control system is prone to malfunction and fails to operate within desired parameters.

SUMMARY OF THE INVENTION

It is therefore an object of the present invention to provide an improved climate control system with blowers, in particular in agricultural or construction machinery.

The invention relates to a climate control system with blowers, in particular in agricultural or construction machinery, having at least two blowers, at least one fresh air/circulating air conduit, at least one circulating air/intake air conduit, an evaporator and, if required, a heater, the evaporator and heater being situated on the air downstream side of the blowers, the blowers being situated at substantially the same height viewed in the longitudinal direction of the vehicle, the first blower drawing in fresh air from at least one fresh air opening, in particular in the rear area of the vehicle, and the second blower drawing in at least circulating air from the vehicle interior from at least two circulating air openings situated on opposite sides of the vehicle, and at least one circulating air/intake air conduit running above and/or below the first blower and leading from the circulating air opening on one side of the vehicle interior to the second blower. An arrangement of this type provides a highly compact design of the climate control system area. In particular, due to the positioning of the blowers upstream from the heat exchangers, it is possible to use more cost-effective blowers than would be the case if the blowers must draw in air through the heat exchangers.

An intermediate air conduit is preferably provided between the first blower and the second blower, and the second blower, acting as a main blower, delivers fresh and circulating air to the evaporator, which is situated downstream. Connecting the blowers in series, whereby circulating air is added between the first and second blower, improves the mixing action, in particular if there are great temperature differences between the cab temperature and the outside temperature, and ensures even temperature regulation of the air, in particular at the evaporator and/or at the heating element, which improves the cooling and/or heating performance and also as a further result of uniform temperature regulation of the air in the cab.

Alternatively, the first blower may supply fresh air and the second blower circulating air directly to the evaporator, i.e. two separate blowers instead of a single main blower may be provided for delivering the fresh air and circulating air to the evaporator. This enables the two blowers to be regulated independently, i.e. it is possible to simplify regulation.

In an embodiment, a circulating air/intake air conduit running directly adjacent to and above or below the first blower leads from one side of the vehicle interior to the second blower, which is at least largely situated on the opposite side of the vehicle.

The rotary axes of the blower motors are preferably situated at an angle of 30° to −105° relative to each other, in particular at an angle that is less than or equal to a right angle. In this case, an angle of less than 90° is advantageous, since the first blower in this case blows air not only into the more proximate intake opening of the second blower, but also blows fresh air to the more remote intake opening.

The rotary axis of the blower motor of the first blower may preferably lie on a plane that stretches between two intersecting lines, the first line running in the direction of travel at an angle in a range between +20° and −20° and the second line being situated at an angle in a range between +20° and −20° in relation to the cab floor. The rotary axis of the blower motor of the first blower can be situated at an angle of no more than 25°, in particular no more than 10°, such that it is inclined in the longitudinal direction of the vehicle. To ensure a favorable course of air flow, the rotary axis of the first blower can be inclined towards the outside in a direction of the more proximate side wall of the machine; to improve the distribution of fresh air, on the other hand, it should be inclined to the inside in the direction of the more distant side wall of the machine.

The rotary axis of the blower motor of the second blower can be situated at an angle of no more than 25°, in particular no more than 10°, such that it is inclined in the lateral direction of the vehicle.

The second blower can have two impellers, between which the blower motor is situated, while the first blower preferably has only one impeller.

It is particularly preferable to situate the first blower entirely on one side of the vehicle in relation to the central longitudinal axis of the vehicle and to situate the second blower largely on the other side of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
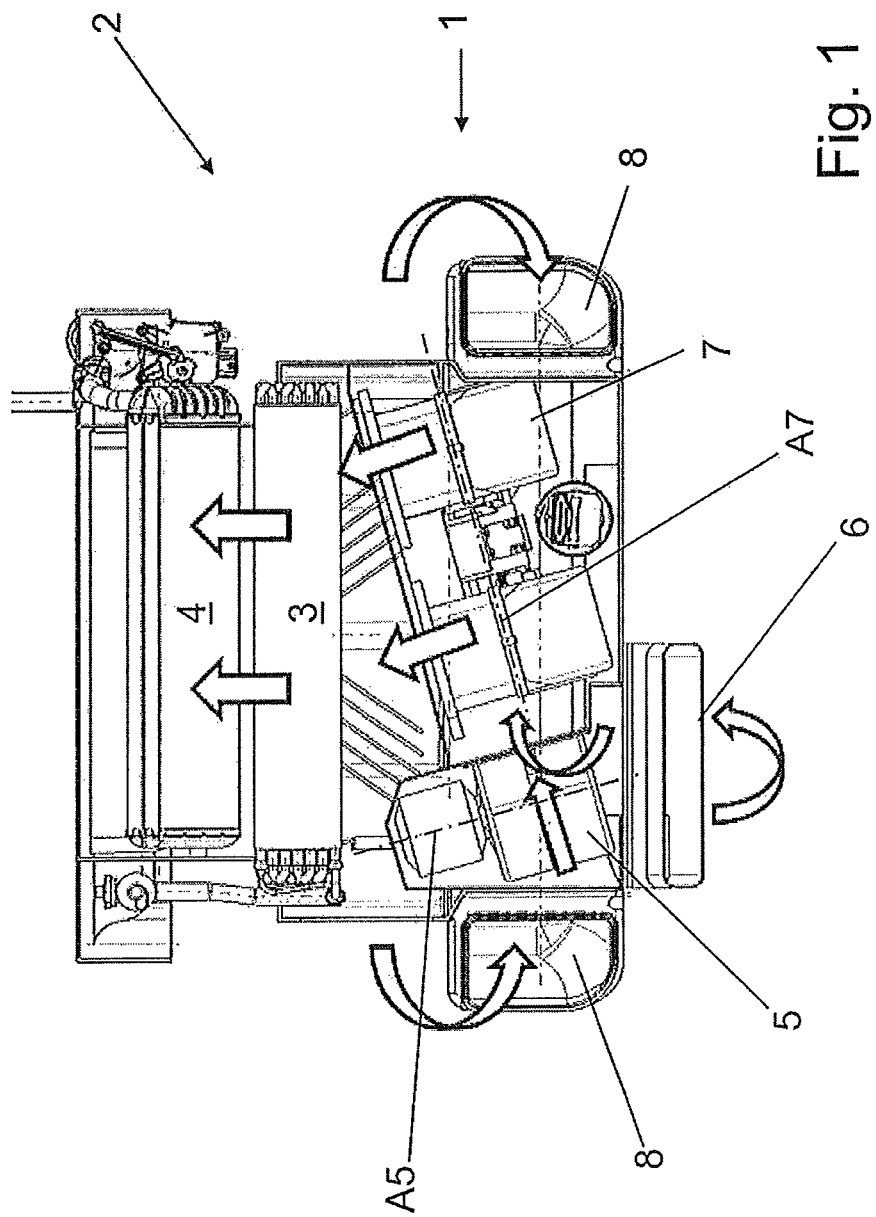
FIG. 1 shows a schematic top view of a climate control system of a construction machine according to a first exemplary embodiment.

According to an exemplary embodiment, a blower system 1 for a climate control system 2 of a construction vehicle is provided, climate control system 2 including an evaporator 3 and a heater 4. A first blower 5 for fresh air intake, which has a fresh air/intake air conduit extending from a fresh air opening 6, is also assigned to climate control system 2. Fresh air opening 6 is provided behind the driver's seat, situated in this case slightly to the side in relation to the central longitudinal axis of the vehicle. A second blower 7 for the overall air intake of fresh air and circulating air is assigned to part of blower system 1, and thus also to climate control system 2, for which reason this second blower is also referred to as the main blower. The circulating air is drawn in directly by the main blower through circulating air conduits extending from circulating air openings 8 situated to the right and left of the driver's seat (not illustrated).

Figure 4:
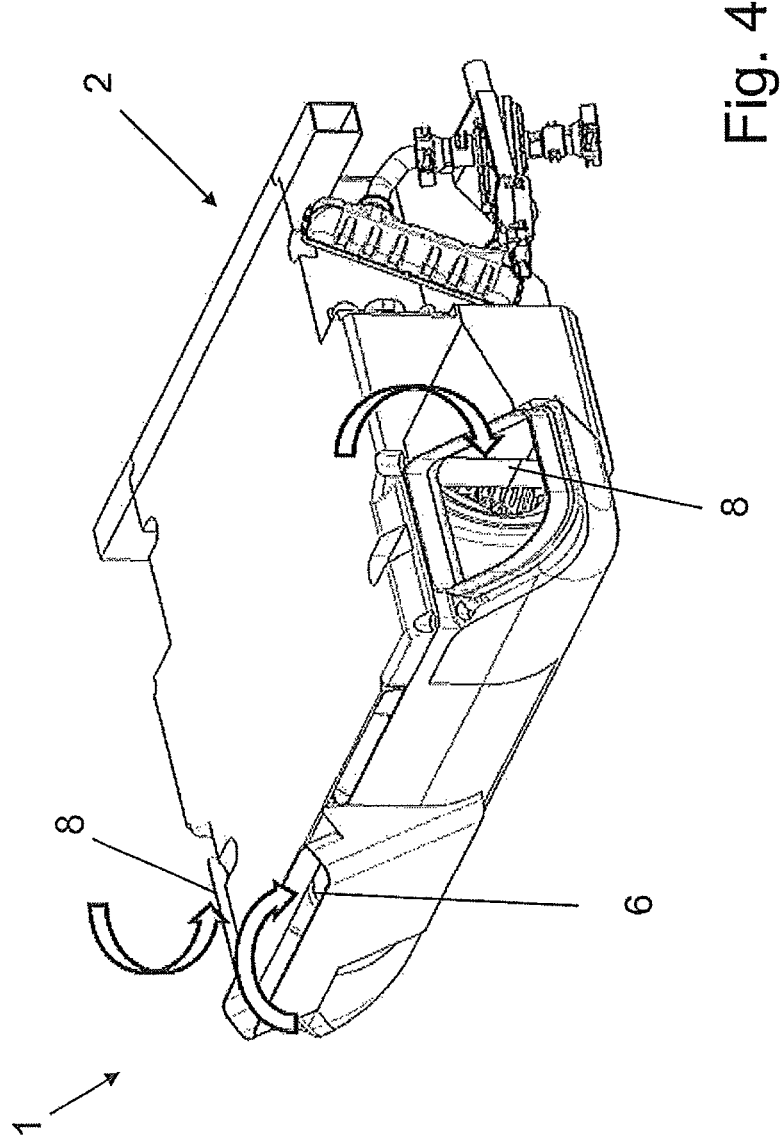
FIG. 4 shows a perspective view of the climate control system from FIG. 1, which is partially situated in a housing.

As shown in FIG. 1, the two blowers 5 and 7 are situated essentially side by side at the same height, viewed in the longitudinal direction of the vehicle, first blower 5 in this case being situated to the left of the central longitudinal axis of the vehicle and second blower 7, which is designed to be larger than first blower 5, being situated to the right of the central longitudinal axis of the vehicle. However, the rotary axes of the individual blower impellers are rotated by 90° in relation to each other, rotary axis A5 in this case facing more or less in the direction of travel (the deviation is approximately 15°), rotary axis A7 of second blower 7, which is designed to have two impellers, facing more or less in the lateral direction of the vehicle (the deviation is approximately 15°) (see FIG. 1). The two blowers 5 and 7 are each situated in blower mounts which are provided in the air supply housing of the climate control system. Parts of the air supply housing may also form areas of the blower housing. Mounts for evaporator 3 and heater 4 are also provided in the air supply housing. On the whole, as shown in FIG. 4, this results in a compact and, in this case almost flat, rectangular design of the overall arrangement, including the intake air conduits.

Figure 2:
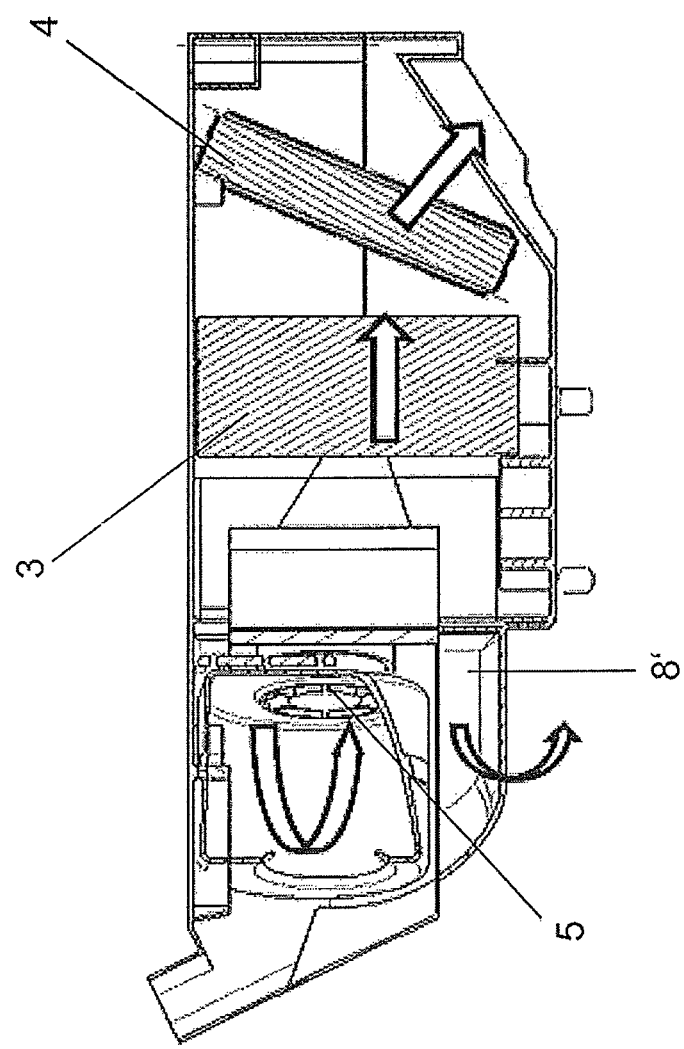
FIG. 2 shows a longitudinal cross section of the climate control system from FIG. 1.
Figure 3:
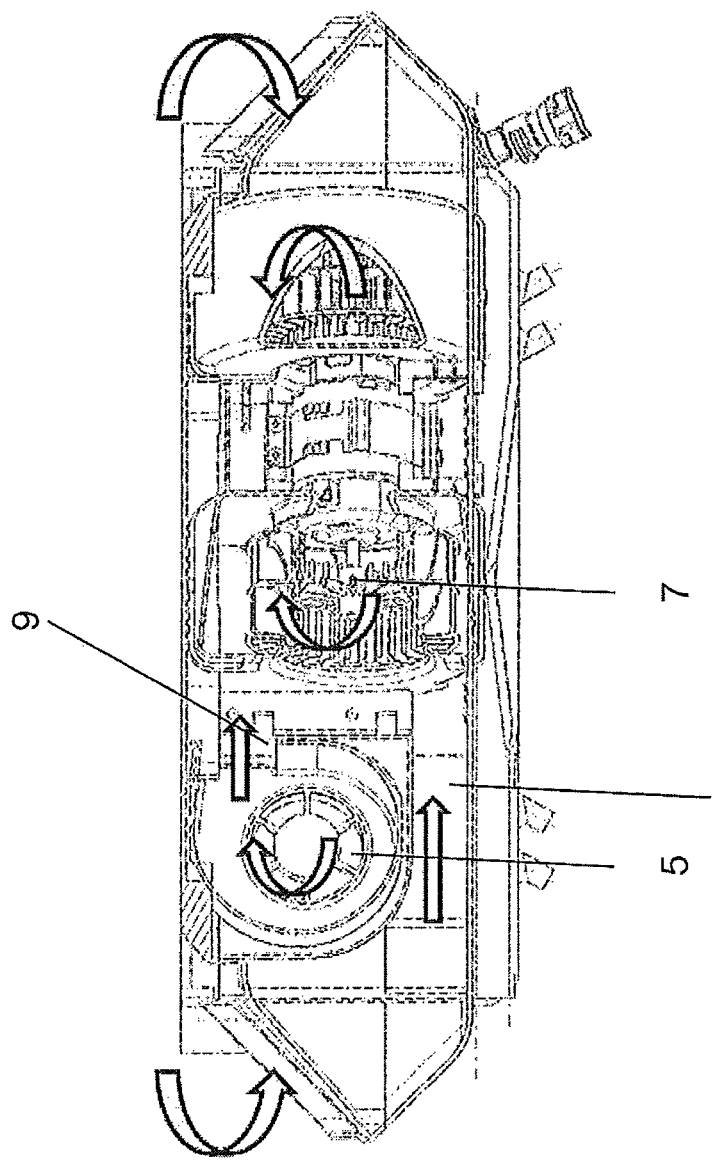
FIG. 3 shows a transverse cross section of the climate control system from FIG. 1.

To reach second blower 7 directly from left circulating air opening 8, circulating air/intake air conduit 8' in this case is routed below first blower 5, as shown in FIG. 2. The right circulating air/intake air conduit leads directly to second blower 7. The fresh air drawn in from the rear by first blower 5 is supplied from first blower 5 to second blower 7 via an intermediate air conduit 9 (see FIG. 3), which is situated above the left circulating air/intake air conduit. The blower motor of first blower 5 is situated at the front in the direction of travel, i.e. in the direct vicinity of evaporator 3. The blower motor of second blower 7 is situated between the two impellers, also in the vicinity of evaporator 3. Heater 4 is situated on the side of evaporator 3 facing blowers 5 and 7, so that the blower motors are protected against heat influences on the part of heater 4 and are, in part, also cooled by evaporator 3 in direct proximity.

According to a first variant of the exemplary embodiment, which is not illustrated in the drawing, the left circulating air/intake air conduit is situated such that it runs above the first blower, so that the supply lines to the second blower are situated in reverse position compared to the exemplary embodiment described above.

According to a second variant of the exemplary embodiment, the first blower motor is sufficiently powerful to supply the fresh intake air directly to the evaporator, i.e. the second blower in this case is not a main blower, but rather solely a circulation blower. In this case as well, the left circulating air/intake air conduit may be situated such that it runs below or above the first blower; however, there is no intermediate air conduit, which is replaced by an air conduit leading directly to the evaporator.

Figure 5:
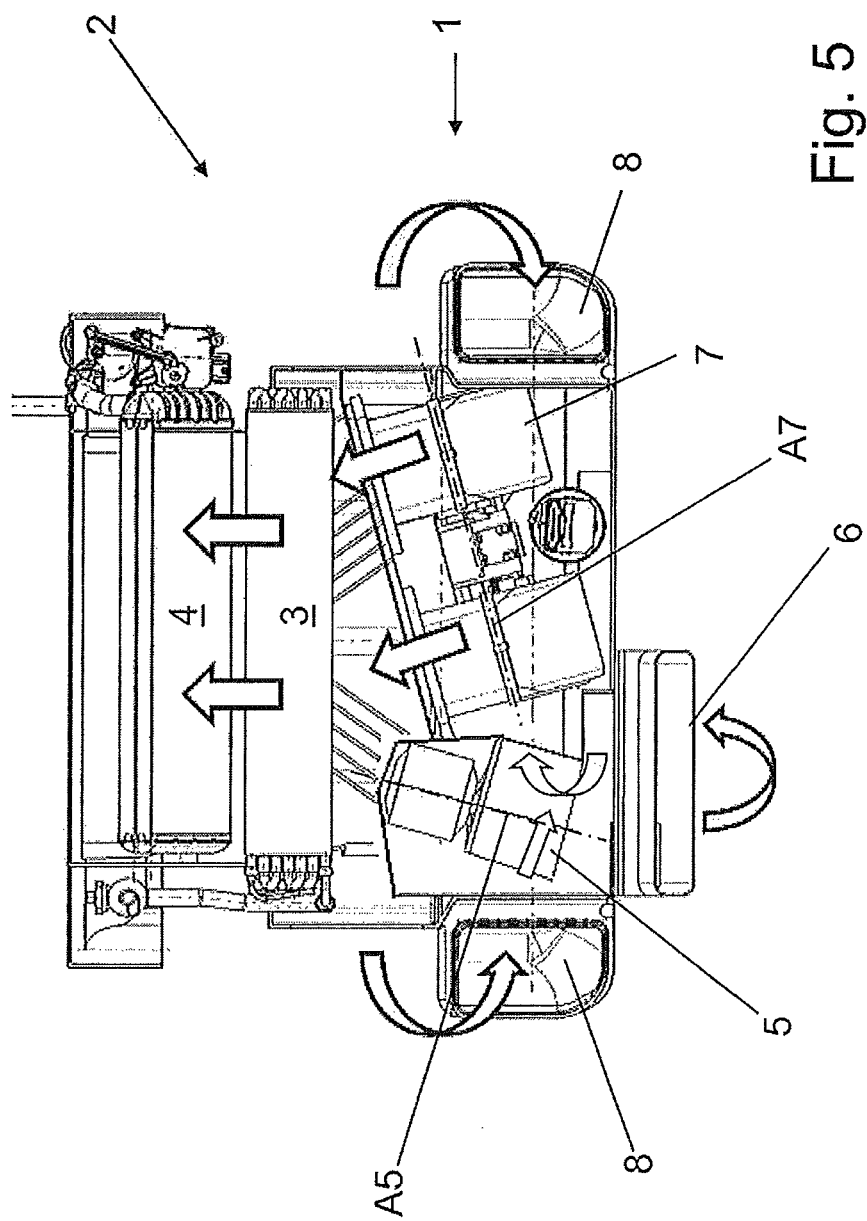
FIG. 5 shows a schematic top view of a climate control system of a construction machine according to the second exemplary embodiment.

According to the second exemplary embodiment illustrated schematically in FIG. 5, a blower system 1 for a climate control system 2 of a construction vehicle is provided, which is slightly modified over the first exemplary embodiment, the same reference numerals as in the first exemplary embodiment being used for equivalent elements or elements having equivalent functions. With regard to the design, reference is hereby made to the description of the first exemplary embodiment, unless otherwise expressly indicated below.

A difference over the first exemplary embodiment is the fact that the orientation of rotary axis A5 of first blower 5 is inclined in the other direction. This rotary axis A5 is now rotated by 15° to the right in the longitudinal direction of the vehicle (corresponding to the verticals in FIG. 5), i.e. toward the center, and not, as provided in the first exemplary embodiment, by 15° to the left, that is toward the outside. However, the arrangement of second blower 7 remains unchanged.

Due to the rotated position of first blower 5, the fresh air drawn in by the first blower via fresh air opening 6 may be more efficiently distributed to the two intake openings of second blower 7, i.e. more fresh air reaches the externally situated blower impeller of second blower 7, which makes it possible to improve fresh air distribution.

Due to the rotated position of first rotary axis A5, blower rotary axes A5 and A7 do not form a right angle, in contrast to the first exemplary embodiment, but rather they are situated relative to each other at a smaller angle, in this case at an angle of 60°.

Although, in this case, rotary axis A5 of first blower 5 is inclined inwardly at a 15° angle, this angle may also be much larger, in order to enable more fresh air to be supplied to the more distant intake opening of second blower 7, thereby making it possible to distribute the fresh air more evenly. The angle may be, for example, 50° and, if necessary, even larger.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A climate control system comprising:
   at least two blowers connected in series;
   at least one fresh air/circulating air conduit;
   an evaporator provided on an air downstream side of the blowers, the blowers being situated at substantially a same height and side by side with respect to a longitudinal direction of a vehicle, wherein a first blower draws in fresh air from at least one fresh air opening or a rear area of the vehicle, and a second blower draws in at least circulating air from a vehicle interior directly from at least two circulating air openings situated on opposite sides of the vehicle, wherein the fresh air from the first blower and the circulating air from the second blower is delivered to the evaporator;
   at least one circulating air/intake air conduit running below the first blower and leading to the second blower from the circulating air opening on a side of the vehicle interior;
   an intermediate air conduit provided between the first blower and the second blower to supply air from the first blower directly to the second blower,
   wherein rotary axes of the blower motors of the at least two blowers are situated relative to each other at an angle of 30° or greater and less than 90°.

2. The climate control system according to claim 1, wherein the second blower is a main blower configured to deliver fresh and circulating air.

3. The climate control system according to claim 1, wherein the first blower supplies exclusively fresh air and the second blower supplies exclusively circulating air directly to the evaporator.

4. The climate control system according to claim 1, wherein the circulating air/intake air conduit running directly adjacent to and below the first blower leads from one side of the vehicle interior to the second blower, which is at least largely situated on an opposite side of the vehicle.

5. The climate control system according to claim 1, wherein a rotary axis of the blower motor of the first blower is configured such that it is inclined at an angle of no more than 25° relative to a longitudinal direction of the vehicle.

6. The climate control system according to claim 1, wherein the rotary axis of the blower motor of the second blower is configured such that it is inclined at an angle of no more than 25° or no more than 10° relative to a longitudinal direction of the vehicle.

7. The climate control system according to claim 1, wherein the second blower has two impellers and wherein the blower motor is provided between the two impellers.

8. The climate control system according to claim 1, wherein the first blower is situated entirely on a first of the vehicle, while the second blower is situated on a second and opposite side of the vehicle.

9. The climate control system according to claim 1, wherein the climate control system is a climate control system for agricultural or construction machinery.

10. The climate control system according to claim 1, further comprising a heater.

11. The climate control system according to claim 10, wherein the heater is provided on the air downstream side of the blowers.

12. The climate control system according to claim 1, wherein the fresh air from the first blower is transferred to the second blower and the second blower delivers the fresh air and the circulating air to the evaporator.

13. A climate control system comprising:
   at least two blowers connected in series;
   at least one fresh air/circulating air conduit;
   an evaporator provided on an air downstream side of the blowers, the blowers being situated at substantially a same height with respect to a longitudinal direction of a vehicle, wherein a first blower draws in fresh air from at least one fresh air opening or a rear area of the vehicle, and a second blower draws in at least circulating air from a vehicle interior directly from at least two circulating air openings situated on opposite sides of the vehicle, wherein the fresh air from the first blower and the circulating air from the second blower is delivered to the evaporator;
   at least one circulating air/intake air conduit running below the first blower and leading to the second blower from the circulating air opening on a side of the vehicle interior; and
   an intermediate air conduit provided between the first blower and the second blower to supply air from the first blower directly to the second blower,
   wherein rotary axes of the blower motors of the at least two blowers are situated relative to each other at an angle of 30° or greater and less than 90°.

14. An air supply housing for a climate control system according to claim 1, comprising:
   mounts for the at least two blowers;
   a fresh air/intake air conduit; and
   a mount for the evaporator and/or a mount for a heater, the evaporator mount or heater mount being situated on an air downstream side of the blower mounts, the blower mounts being situated at substantially a same height with respect to a longitudinal direction of the vehicle, the first blower mount being connectable to a fresh air opening in the rear area of the vehicle, and the second blower mount being connectable to the at least two circulating air openings, and the at least one circulating air/intake air conduit running above and/or below the first blower mount and leading from the circulating air opening to the second blower mount on one side of the vehicle interior.

15. A climate control system for a vehicle comprising:
a housing having a front and a rear and a fresh air inlet and first and second circulating air inlets;
a first blower and a second blower mounted in series in the housing at approximately equal distances from the housing rear;
at least one fresh air pathway from the fresh air inlet to the first blower;
a first circulating air pathway from the first circulating air inlet to the second blower;
a second circulating air pathway from the second circulating air inlet to the second blower;
an evaporator provided at the housing front, wherein air from the first blower and air from the second blower is delivered to the evaporator; and
an intermediate air conduit provided between the first blower and the second blower to supply air from the first blower directly to the second blower,
wherein the first circulating air pathway runs below the first blower, and
wherein rotary axes of the blower motors of the first blower and the second blower are situated relative to each other at an angle of 30° or greater and less than 90°.

16. The climate control system according to claim 15, wherein the housing is mountable in the vehicle with the housing front toward a front of the vehicle and with the housing rear toward a rear of the vehicle and with a rotary axis of the blower motor of the first blower configured such that it is inclined at an angle of no more than 25° relative to a longitudinal direction of the vehicle.

17. The climate control system according to claim 15, wherein a rotary axis of the first blower is generally perpendicular to a rotary axis of the second blower.

18. The climate control system according to claim 15, wherein the fresh air inlet is located at the housing rear, the first circulating air inlet is located at a first side of the housing and the second circulating air inlet is located at a second side of the housing, opposite the first side of the housing.

19. The climate control system according to claim 15, wherein the first and second blowers are mounted in the housing such that a line perpendicular to a longitudinal centerline of the vehicle passes through the first blower and the second blower.

20. An agricultural or construction machine having an air-conditioner, comprising:
at least two blowers connected in series;
at least one fresh air intake air duct;
at least one circulating air intake air duct;
an evaporator and a heater, which are arranged on an air outflow side of the blowers, the heater being arranged on a side of the evaporator facing away from the blowers; and
an intermediate air conduit is provided between the first blower and the second blower to supply air from the first blower directly to the second blower,
wherein the first blower sucks in fresh air from at least one fresh air opening in a rear region of the agricultural or construction machine, and the second blower sucks in at least circulating air from an interior of the agricultural or construction machine from at least two circulating air openings arranged on sides of the agricultural or construction machine which are located opposite each other, and the at least one circulating air intake air duct running above or below the first blower leading from the circulating air opening on one side of the agricultural or construction machine interior to the second blower.

21. The agricultural or construction machine according to claim 20, wherein rotary axes of the first blower and the second blower are arranged at an angle of 75° to 105° to each other.

22. The agricultural or construction machine according to claim 20, wherein a rotary axis of a blower motor of the first blower is arranged sloping to a longitudinal direction of the agricultural or construction machine at an angle of a maximum of 25°.

23. The agricultural or construction machine according to claim 20, wherein a rotary axis of a blower motor of the second blower is arranged sloping to a longitudinal direction of the agricultural or construction machine at an angle of a maximum of 25°.

24. The agricultural or construction machine according to claim 20, wherein the second blower comprises two impellers with a blower motor arranged in between.

25. The agricultural or construction machine according to claim 20, wherein the first blower and the second blower are arranged on opposite sides of the agricultural or construction machine.

* * * * *